(12) United States Patent
Saravanabhavan et al.

(10) Patent No.: US 10,455,365 B1
(45) Date of Patent: Oct. 22, 2019

(54) SYSTEM AND METHOD FOR OPTIMIZED TRACKING AND IDENTIFICATION OF USER EQUIPMENT

(71) Applicant: Cognizant Technology Solutions India Pvt. Ltd, Chennai (IN)

(72) Inventors: Hari Saravanabhavan, Bangalore (IN); Chandrasekhar Balasubramanyam, Bangalore (IN)

(73) Assignee: COGNIZANT TECHNOLOGY SOLUTIONS INDIA PVT. LTD., Chennai (IN)

(*) Notice: Subject to any disclaimer, the term of this patent is extended or adjusted under 35 U.S.C. 154(b) by 0 days.

(21) Appl. No.: 16/176,341

(22) Filed: Oct. 31, 2018

(30) Foreign Application Priority Data

Sep. 6, 2018 (IN) .............. 201841033467

(51) Int. Cl.
| | |
|---|---|
| H04W 24/00 | (2009.01) |
| H04W 4/029 | (2018.01) |
| H04W 4/021 | (2018.01) |
| G06Q 30/02 | (2012.01) |
| G01S 5/02 | (2010.01) |
| G06K 9/00 | (2006.01) |
| H04W 4/33 | (2018.01) |

(52) U.S. Cl.
CPC .......... *H04W 4/029* (2018.02); *G01S 5/0257* (2013.01); *G06Q 30/0255* (2013.01); *G06Q 30/0261* (2013.01); *G06Q 30/0267* (2013.01); *H04W 4/021* (2013.01); *G06K 9/00288* (2013.01); *H04W 4/33* (2018.02)

(58) Field of Classification Search
CPC . H04W 4/02; H04W 64/00; H04W 29/08657; G01S 5/0252; G01S 5/02; G01S 5/14; H04L 29/08108; H04L 29/08936; H04M 1/72572; G01C 21/20

USPC .. 455/432.2–433, 412.2–414.3, 456.1–456.3
See application file for complete search history.

(56) References Cited

U.S. PATENT DOCUMENTS 9,588,342 B2 3/2017 Grigg
2010/0145784 A1* 6/2010 Sriver .................... G01C 21/20
705/14.25

(Continued)

OTHER PUBLICATIONS

David Sealey, "How to Identify Retail Customers in Store", Nov. 23, 2016. Internet Blog, https://econsultancy.com/how-to-identify-retail-customers-in-store/.

*Primary Examiner* — Dai Phuong
(74) *Attorney, Agent, or Firm* — Cantor Colburn LLP

(57) ABSTRACT

A system and method for tracking and identifying user equipment(s) is provided. The present invention provides for determining if a user store location is included within a list of stores associated with the business entity. Further, the present invention provides for determining the user equipment location within a predefined range of one or more stores associated with the business entity. The invention further provides for identifying a target user equipment based on one or more parameters if the user equipment location is same as one of the store locations associated with the business entity. The target user equipment is representative of a user equipment associated with a valued user. The identification of the target user equipment triggers, at least one of a Wi-Fi based technique and an image recognition technique to determine precise location of the target user equipment within the store.

22 Claims, 5 Drawing Sheets

(56) References Cited

U.S. PATENT DOCUMENTS

| | | | |
|---|---|---|---|
| 2012/0252483 A1* | 10/2012 | Farmer | G01C 21/3602 |
| | | | 455/456.1 |
| 2012/0258776 A1* | 10/2012 | Lord | G06K 9/00993 |
| | | | 455/556.1 |
| 2013/0072226 A1* | 3/2013 | Thramann | H04W 4/029 |
| | | | 455/456.1 |
| 2013/0122942 A1* | 5/2013 | Jun | G01S 5/16 |
| | | | 455/457 |
| 2016/0092955 A1 | 3/2016 | Gopalsamy | |
| 2016/0342911 A1 | 11/2016 | Kannan | |
| 2017/0053330 A1 | 2/2017 | Smith | |
| 2017/0238238 A1* | 8/2017 | Hasegawa | H04W 48/04 |
| | | | 455/435.1 |
| 2017/0300999 A1 | 10/2017 | Wilkinson | |
| 2017/0330235 A1 | 11/2017 | Pathak | |
| 2019/0007149 A1* | 1/2019 | Fujita | H04M 1/00 |

* cited by examiner

SYSTEM AND METHOD FOR OPTIMIZED TRACKING AND IDENTIFICATION OF USER EQUIPMENT

CROSS REFERENCE TO RELATED APPLICATION

This application is related to and claims the benefit of Indian Patent Application Number 201841033467 filed on Sep. 6, 2018, the contents of which are herein incorporated by reference in their entirety.

FIELD OF THE INVENTION

The present invention relates generally, to the field of tracking systems. More particularly, the present invention relates to a system and a method for optimized tracking and identification of user equipment(s).

BACKGROUND OF THE INVENTION

In the modern era, there is an increasing demand in various entities of the service industry for tools and techniques which facilitate better services and unmatched experiences to valued users. However, existing technologies dealing with tracking of user equipment associated with valued users operating in various locations across various segments lack one or more necessary features. Examples of various segments may include healthcare, insurance, automotive, travel agency, retail stores, apparel showrooms etc. For instance, a user equipment associated with a valued user using one of the services at a particular location, out of various services at various locations provided by a business entity may be identified only at that particular location, however, the same user equipment may not be identified as associated with the valued user at other locations or for other business segments, leading to user dissatisfaction. Such problems arise due to inefficient user data integration methods for data obtained from myriad sources. Further, it has been observed that traditional systems employing fragmented user data analytics fails to provide for optimal tracking and identification of user equipment.

In light of the aforementioned drawbacks, there is a need for a system and method for efficiently tracking and identifying user equipment across various segments of a business entity at various locations. There is a need for system and method which provides improved user data integration and analytics for optimally tracking and identifying user equipment associated with valued users. Yet further, there is need for a system and method which can be easily integrated with existing systems.

SUMMARY OF THE INVENTION

In various embodiments of the present invention, a method for tracking and identifying a user equipment is provided. The method is implemented by at least one processor executing program instructions stored in a memory. The method comprises identifying, by the processor, a user equipment within a predefined range of predetermined location coordinates of one or more stores associated with a business entity. The method further comprises determining, by the processor, the user equipment as a target user equipment using one or more parameters based. The target user equipment is representative of a user equipment associated with a valued user. Finally, the method comprises determining, by the processor, a precise location of the target user equipment within one or more stores associated with the business entity via at least one of: a Wi-Fi based technique and an image recognition technique.

In another embodiment of the present invention, a method for tracking and identifying a user equipment is provided. The method is implemented by at least one processor executing program instructions stored in a memory. The method comprises identifying, by the processor, a user equipment within a predefined range of predetermined location coordinates of one or more stores associated with the business entity. The method further comprises determining, by the processor, the user equipment as a target user equipment using one or more parameters. The target user equipment is representative of a user equipment associated with a valued user. Furthermore, the method comprises determining, by the processor, a first precise location and a second precise location for the target user equipment. Yet further, the method comprises mapping, by the processor, the second precise location with the first precise location to determine a precise location of the target equipment until a valid mapping is ascertained.

In various embodiments of the present invention, a system for tracking and identifying a user equipment is provided. The system interfaces with an entity database, a user equipment database and a store terminal device. The system comprises a memory storing program instructions, a processor configured to execute program instructions stored in the memory, and a tracking and identification engine in communication with the processor. The system is configured to identify the user equipment within a predefined range of predetermined location coordinates of one or more stores associated with a business entity. Further, the system is configured to determine the user equipment as a target user equipment using one or more parameters based. The target user equipment is representative of a user equipment associated with a valued user. Finally, the system is configured to determine a precise location of the target user equipment within one or more stores associated with the business entity via at least one of: a Wi-Fi based technique and an image recognition technique.

In another embodiment of the present invention, a system for tracking and identifying a user equipment is provided. The system interfaces with an entity database, a user equipment database and a store terminal device. The system comprises a memory storing program instructions, a processor configured to execute program instructions stored in the memory, and a tracking and identification engine in communication with the processor. The system is configured to identify a user equipment within a predefined range of predetermined location coordinates of one or more stores associated with the business entity. Further, the system is configured to determine the user equipment as a target user equipment using one or more parameters. The target user equipment is representative of a user equipment associated with a valued user. Furthermore, the system is configured to determine a first precise location and a second precise location for the target user equipment. Finally, the system is configured to map the second precise location with the first precise location to determine a precise location of the target equipment until a valid mapping is ascertained.

In various embodiments of the present invention, a computer program product is provided. The computer program product comprises a non-transitory computer-readable medium having computer-readable program code stored thereon, the computer-readable program code comprising instructions that, when executed by a processor, cause the processor to identify the user equipment within a predefined range of predetermined location coordinates of one or more stores associated with a business entity. Further, the user equipment as a target user equipment using one or more parameters based is determined. The target user equipment is representative of a user equipment associated with a valued user. Finally, a precise location of the target user equipment within one or more stores associated with the business entity via at least one of: a Wi-Fi based technique and an image recognition technique is determined.

In another embodiment of the present invention, the computer program product comprises a non-transitory computer-readable medium having computer-readable program code stored thereon, the computer-readable program code comprising instructions that, when executed by a processor, cause the processor to identify a user equipment within a predefined range of predetermined location coordinates of one or more stores associated with the business entity. Further, the user equipment as a target user equipment using one or more parameters is determined. The target user equipment is representative of a user equipment associated with a valued user. Furthermore, a first precise location and a second precise location for the target user equipment are determined. Yet further, the second precise location is mapped with the first precise location to determine a precise location of the target equipment until a valid mapping is ascertained.

BRIEF DESCRIPTION OF THE ACCOMPANYING DRAWINGS

The present invention is described by way of embodiments illustrated in the accompanying drawings wherein.

DETAILED DESCRIPTION OF THE INVENTION

Figure 1:
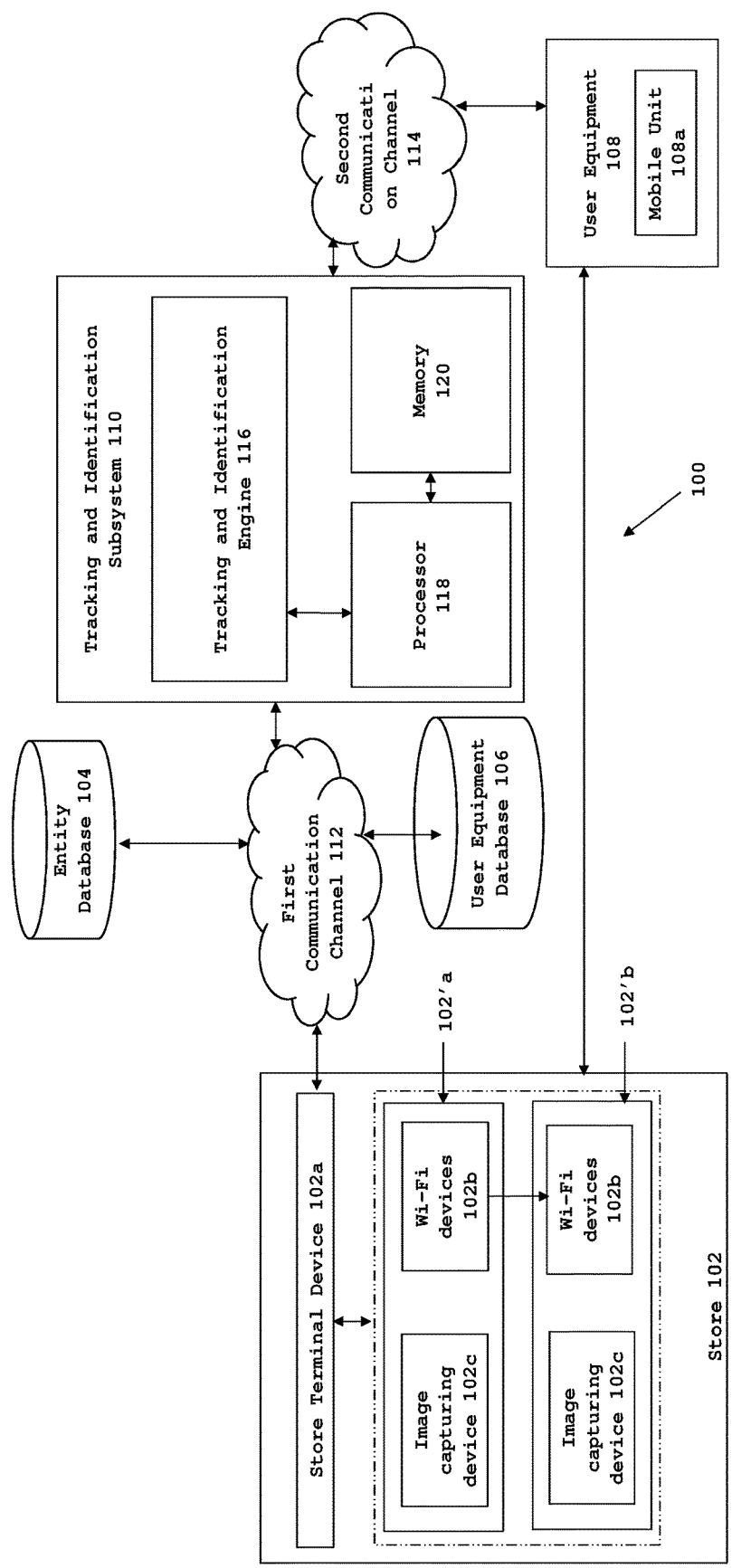
FIG. 1 illustrates a block diagram of a system for tracking and identifying user equipment, in accordance with various embodiments of the present invention.

The present invention discloses a system and a method for tracking and identifying user equipment(s). In particular, the present invention provides for tracking and identification of user equipment(s) across one or more units or stores associated with a business entity. In operation, the present invention provides for determining if a user store location is included within a list of stores associated with the business entity based on one or more inputs received from a user equipment associated with a user to trigger user equipment tracking and identification. The user store location is representative of the store location the user is visiting. Further, the present invention provides for determining if the user equipment location is same as one of the stores associated with the business entity by retrieving location data from the user equipment. The invention further provides for identifying a target user equipment based on one or more parameters if the user equipment location is same as one of the stores associated with the business entity. The target user equipment is representative of a user equipment associated with a valued user. The identification of the target user equipment triggers, at least one of a Wi-Fi based technique and one or more image recognition techniques to determine precise location of the target user equipment within the store based on the determined user equipment location. The precise location of the target user equipment within the store may include but is not limited to floor number and floor section associated with the store. Furthermore, the present invention provides for validating the precise location of the target user equipment based on a comparison between the precise locations determined from the Wi-Fi based technique and the one or more image recognition techniques. Yet further, the present invention provides for alerting the store with the determined precise location of the target user equipment.

The disclosure is provided in order to enable a person having ordinary skill in the art to practice the invention. Exemplary embodiments herein are provided only for illustrative purposes and various modifications will be readily apparent to persons skilled in the art. The general principles defined herein may be applied to other embodiments and applications without departing from the spirit and scope of the invention. The terminology and phraseology used herein is for the purpose of describing exemplary embodiments and should not be considered limiting. Thus, the present invention is to be accorded the widest scope encompassing numerous alternatives, modifications and equivalents consistent with the principles and features disclosed herein. For purposes of clarity, details relating to technical material that is known in the technical fields related to the invention have been briefly described or omitted so as not to unnecessarily obscure the present invention.

The present invention would now be discussed in context of embodiments as illustrated in the accompanying drawings.

FIG. 1 illustrates a block diagram of a system for tracking and identifying a user equipment, in accordance with various embodiments of the present invention. Referring to FIG. 1, in an embodiment of the present invention, the system 100 interfaces with a store 102 associated with a business entity (not shown), and comprises an entity database 104, a user equipment database 106, a user equipment 108 and a tracking and identification subsystem 110.

In various embodiments of the present invention, the business entity (not shown) may be operating at various locations to provide services across various segments such as healthcare, insurance, automotive, travel agency, retail stores, apparel showrooms etc. In an embodiment of the present invention, the store 102 associated with the business entity may be operating in one or more segments out of the various aforementioned segments. In an exemplary embodiment of the present invention, as illustrated in FIG. 1, the store 102 is an apparel showroom. The store 102 may extend over one or more floors. The store 102 comprises a store terminal device 102a, one or more Wi-Fi devices 102b and one or more image capturing devices 102c. In another embodiment of the present invention, the store 102 may include either one or more Wi-Fi devices 102b or one or more image capturing devices 102c. In yet another embodiment of the present invention, the store terminal device 102a may be used as a Wi-Fi device. Examples of the store terminal device 102a may include but are not limited to a smart phone, a computer, a tablet, a microcomputer or any other wired or wireless terminal device capable of executing instructions.

In various embodiments of the present invention, the one or more Wi-Fi devices 102b and one or more image capturing devices 102c are configured to interface with the store terminal device 102*a*. In an embodiment of the present invention, the store terminal device 102*a* is configured to retrieve data associated with the user equipment 108 and the associated user via the one or more Wi-Fi devices 102*b* and one or more image capturing devices 102*c*. The store terminal device 102*a* is configured to convert the retrieved data into an appropriate format and transmit it to the tracking and identification subsystem 110. Further, the store terminal device 102*a* is configured to provide a bill generation and purchase management facility to the store 102. The generated bills and purchase data are maintained in the user equipment database 106 via the tracking and identification subsystem 110.

In various embodiments of the present invention, the one or more Wi-Fi devices 102*b* may include any device capable of hosting a wireless access point. The Wi-Fi devices 102*b* may be wired or wireless. Examples of the Wi-Fi devices 102*b* may include, but are not limited to modems, routers, repeaters, smartphone, computers, laptops etc. The one or more Wi-Fi devices 102*b* may be installed at each of the floors 102'*a* and 102'*b* of the store 102. Each of the one or more Wi-Fi devices 102*b* may be classified based on floor details of the store 102, such as floor number and floor section. In an embodiment of the present invention, a Wi-Fi device database (not shown) may be maintained in the store terminal device 102*a*.

Examples of the one or more image capturing devices 102*c* may include, but are not limited to optical sensors, video cameras, high resolution still image cameras, internet protocol (IP) cameras or any other device capable of capturing images. In an exemplary embodiment of the present invention, the one or more image capturing devices 102*c* is a video camera. The one or more image capturing devices 102*c* may be arranged at desired angles at respective floors 102'*a* and 102'*b* of the store 102. For instance the one or more image capturing devices 102*c* may be located overhead of a store entry and exit (e.g. on the ceiling of the store entry). The one or more image capturing devices 102*c* may also be arranged at various sections within the respective floors 102'*a* and 102'*b* (e.g. a jeans section, a shirt section and the like). Each of the one or more image capturing devices 102*c* may be classified based on floor details of the store 102, such as floor number and floor section. In an embodiment of the present invention, an image capturing device database (not shown) may be maintained in the store terminal device 102*a*.

In an embodiment of the present invention the entity database 104 may be maintained in a storage server which is at a location remote to the tracking and identification subsystem 110. In an embodiment of the present invention, the storage server (not shown) may be a cloud based server. In another embodiment of the present invention, the entity database 104 may be maintained in a separate storage within the tracking and identification subsystem 110. The entity database 104 comprises data associated with the business entity. In an exemplary embodiment of the present invention, the data associated with the business entity may include, but is not limited to a list of various stores associated with the business entity, location coordinates of the various stores, partner stores associated with the business entity and associated coordinates, service segments catered by each of the various stores and the partner stores, customer service helpline numbers, offers and discounts available on various goods and services at the store. In an embodiment of the present invention, the entity database 104 may be updated in real-time by the tracking and identification subsystem 110.

In an embodiment of the present invention, the user equipment database 106 may be maintained in the same storage server as the entity database 104 or a separate storage server. The storage server may be at a location remote to the tracking and identification subsystem 110. In another embodiment of the present invention, the user equipment database 106 may be maintained in a separate storage within the tracking and identification subsystem 110. The user equipment database 106 comprises data associated with the user equipment 108 which has been previously tracked by the tracking and identification subsystem 110. In an exemplary embodiment of the present invention, the data associated with the user equipment 108 may include, but is not limited to a user equipment ID, phone number registered with the user equipment 108, store location of the one or more stores associated with the business entity where the user equipment 108 was previously tracked, discounts, offers availed and purchase history associated with the registered phone number or the user equipment ID, time duration of user visit to the one or more stores, associated user name, address, face images and facial details. In an embodiment of the present invention, the user equipment database 106 may be updated in real-time by the tracking and identification subsystem 110 using one or more cognitive computing techniques which may include, but is not limited to, machine learning techniques, artificial intelligence, pattern recognition techniques, deep learning techniques or the like.

In various embodiments of the present invention, the user equipment 108 is a device capable of executing instructions and communicating via at least a cellular network amongst other network channels. Examples of the user equipment 108 may include, but are not limited to a smart phone, a computer, a tablet, microcomputer or any other wired or wireless terminal capable of executing instructions. In an embodiment of the present invention, the user equipment 108 comprises a mobile unit 108*a* associated with the tracking and identification subsystem 110. The mobile unit 108*a* may be a software module or a hardware module integrated with the user equipment 108. In an exemplary embodiment of the present invention, as shown in FIG. 1, the mobile unit 108*a* is a software module. The mobile unit 108*a* enables a user to interact with the tracking and identification subsystem 110. The mobile unit 108*a* receives one or more inputs and one or more requests from the user of the user equipment 108 and transmits the one or more inputs and requests to the tracking and identification subsystem 110. In an exemplary embodiment of the present invention, the one or more inputs and the one or more requests may include, but are not limited to user store location, store direction, purchase history, available offers and discounts. The user store location is representative of the store location the user is visiting. The mobile unit 108*a* is configured to interact with the entity database 104 and the user equipment database 106 via the tracking and identification subsystem 110 to retrieve data associated with the business entity such as store coordinates, and user equipment data such as purchase history, available offers and discounts. Further, the user equipment 108 is configured to interface with the store terminal device 102*a* and the one or more Wi-Fi devices 102*b* via the mobile unit 108*a*, as described later in the specification.

In an exemplary embodiment of the present invention, as shown in FIG. 1, the tracking and identification subsystem 110 interfaces with the store terminal device 102*a*, the entity database 104, and the user equipment database 106 via a first communication channel 112. The tracking and identification subsystem 110 interfaces with the user equipment 108 via a second communication channel 114. Further, the first and the second communication channels (112,114) may include a physical transmission medium, such as, a wire, or a logical connection over a multiplexed medium, such as, a radio channel in telecommunications and computer networking. The examples of radio channel in telecommunications and computer networking may include, but are not limited to a Local Area Network (LAN), a Metropolitan Area Network (MAN), and a Wide Area Network (WAN).

Further, the tracking and identification subsystem 110 comprises a tracking and identification engine 116, a processor 118 and a memory 120. The tracking and identification engine 116 is operated via the processor 118 specifically programmed to execute instructions stored in the memory 120 for executing functionalities of the tracking and identification engine 116 in accordance with various embodiments of the present invention.

The tracking and identification engine 116 is configured to automatically retrieve, extract and analyse complex data, track user equipment 108, identify a target user equipment, determine precise location of the target user equipment, and maintain the entity database 104 and the user equipment database 106.

In various embodiments of the present invention, the tracking and identification engine 116 is configured to receive the one or more inputs and the one or more requests from the user equipment 108 via the mobile unit 108a. The one or more inputs and the one or more requests may include, but are not limited to user store location, store direction, purchase history, available offers and discounts. The tracking and identification engine 116 retrieves data from the entity database 104 and the user equipment database 106 to complete the one or more requests received from the user equipment 108.

In an embodiment of the present invention, the tracking and identification engine 116, is configured to perform a check to determine if the user store location received from the user equipment 108 is associated with the business entity. The user store location is representative of the store location the user is visiting. In an exemplary embodiment of the present invention, the user store location is the location of the store 102. In particular, the tracking and identification engine 116 determines if the user store location is included in the list of stores maintained in the entity database 104. The tracking and identification engine 116 sends a notification suggesting another store location to the user equipment 108 if the user store location is not included within the list of stores. If the user store location is included in the list of stores, the tracking and identification engine 116 triggers tracking and identification of the user equipment 108. In operation, the tracking and identification engine 116 retrieves coordinates of the user store location from the entity database 104. The tracking and identification engine 116, retrieves the user equipment ID and the phone number registered with the user equipment 108 via the mobile unit 108a. Further, the tracking and identification engine 116, retrieves location coordinates of the registered phone number from an associated cellular network provider (not shown). The location coordinates of the registered phone number are representative of the location coordinates of the user equipment 108. The tracking and identification engine 116, performs a check to determine if the location coordinates of the user equipment 108 are same as the coordinates associated with user store location. The tracking and identification 116 continuously retrieves location coordinates of the user equipment 108 via the cellular network provider until the location coordinates of the user equipment 108 are within a predefined range of the coordinates associated with the user store location. The tracking and identification engine 116 provides for identifying a target user equipment (as described in later part of the specification) if the location coordinates of the user equipment 108 are within a predefined range of coordinates of the user store location.

In another embodiment of the present invention, the tracking and identification engine 116 is configured to automatically track the location coordinates of the user equipment 108 via a cellular network provider. Subsequently, the tracking and identification engine 116 suggests one or more nearby stores associated with the business entity. The tracking and identification engine 116 performs a check to determine if the location coordinates of the user equipment 108 are same as the location coordinates of the one or more suggested stores associated with the business entity. The tracking and identification engine 116 provides for identifying a target user equipment (as described in paragraph below) if the location coordinates of the user equipment 108 are within a predefined range of coordinates of the one or more stores associated with the business entity. The target user equipment is representative of the user equipment 108 associated with a valued user.

The tracking and identification engine 116 is configured to identify a target user equipment based on one or more parameters. In an exemplary embodiment of the present invention, the one or more parameters include, but are not limited to, discounts, offers availed and purchase history associated with the registered phone number or the user equipment ID, time duration of user visit in the one or more stores. In operation, in an embodiment of the present invention, the tracking and identification engine 116 performs a check to determine if the registered phone number or the user equipment ID is stored within the user equipment database 106. If the registered phone number or user equipment ID is stored in the user equipment database 106, the tracking and identification engine 116 identifies the target user equipment based on the above described parameters. If the registered phone number or the user equipment ID is not stored in the user equipment database 106, the tracking and identification engine 116 identifies the user equipment 108 as a first time user equipment and updates the user equipment database with associated phone number or user equipment ID. Further, the tracking and identification engine 116 is configured to collect other user equipment data such as store location of the one or more stores associated with the business entity where the user equipment 108 was tracked, discounts, offers availed and purchases, time duration of a visit in the one or more stores, user name, address, face images and facial details associated with the user equipment 108 (not identified as the target user equipment). The user equipment data may be collected from the one or more Wi-Fi devices 102b and the one or more image capturing devices 102c via the store terminal device 102a. The collected user equipment data is stored in the user equipment database 106 to identify the target user equipment in future.

Further, if the user equipment 108 is identified as the target user equipment, the tracking and identification engine 116 triggers a Wi-Fi based technique and one or more image recognition techniques to determine precise location of the target user equipment within the store 102. In another embodiment of the present invention, the tracking and identification engine 116 triggers either a Wi-Fi based technique or one or more image recognition techniques to determine precise location of the target user equipment within the store 102. The precise location of the target user equipment within the store 102 may include but is not limited to floor number and floor section associated with the store 102.

In an embodiment of the present invention, the tracking and identification engine 116 invokes the Wi-Fi based technique based on the location coordinates of the user equipment 108 to identify the precise location associated with the user equipment 108 identified as the target user equipment. In operation, the tracking and identification engine 116 invokes the store terminal device 102a to retrieve the user equipment ID associated with user equipment 108 (identified as the target user equipment). The store terminal device 102a retrieves the user equipment ID via the one or more Wi-Fi devices 102b. As described in paragraph 21, each of the one or more Wi-Fi devices 102b may be classified based on floor details of the store 102, such as floor number and floor section. The tracking and identification engine 116, determines at least the floor number associated with the user equipment 108 identified as the target user equipment from the Wi-Fi device database (not shown) maintained in the store terminal device 102a. The floor details associated with the Wi-Fi device 102b receiving the user equipment ID is representative of the precise location of the user equipment 108 identified as the target user equipment.

Further, the tracking and identification engine 116, triggers an image recognition technique based on the location coordinates of the user equipment 108 to identify the precise location associated with the user equipment 108 identified as the target user equipment. In operation in an embodiment of the present invention, the tracking and identification engine 116 invokes the store terminal device 102a to retrieve the face images of the user associated with the user equipment 108 (identified as the target user equipment). The store terminal device 102a retrieves the face images of the users associated with user equipment 108 via the one or more image capturing devices 102c. The tracking and identification engine 116 maps the retrieved face images with the face images stored in the user equipment database 106. If the retrieved images do not match, the tracking and identification engine 116 sends a warning notification to the store terminal device 102a. The warning notification is representative that a different user is carrying the target user equipment and a manual face recognition is required. If the retrieved images match, the tracking and identification engine 116 marks the location of the image capturing device 102c capturing the face images as the precise location of the user equipment 108 identified as the target user equipment. The location of the image capturing device 102c may be retrieved from the image capturing device database (not shown) maintained in the store terminal device 102a.

In operation in another embodiment of the present invention, the tracking and identification engine 116 retrieves the face images of the user associated with user equipment 108 (identified as the target user equipment) from user equipment database 106. Further, the tracking and identification engine 116 invokes the store terminal device 102a to search for the users associated with user equipment 108 (identified as the target user equipment) in the store which matches the retrieved face images via the one or more image capturing devices 102c. If the retrieved face images do not match with any of the users associated with the user equipment 108 in the store 102, the tracking and identification engine 116 sends a warning notification to the store terminal device 102a after a predefined number of attempts. The warning notification is representative that a different user is carrying the target user equipment and a manual face recognition is required. If the retrieved images match, the tracking and identification engine 116 marks the location of the image capturing device 102c capturing the face images as the precise location of the user equipment 108 identified as the target user equipment. The location of the image capturing device 102c may be retrieved from the image capturing device database (not shown) maintained in the store terminal device 102a.

Advantageously, the image recognition technique is not used to identify a user associated with the target user equipment, rather the image recognition technique is used to identify the location of the target user equipment by searching for the faces associated with the valued user based on the face images retrieved from the user equipment database, and marking the location of the image capturing device which captures user associated with the target user equipment as the location of the target user equipment.

Furthermore, the tracking and identification engine 116 is configured to validate the precise location of the user equipment 108 identified as the target user equipment based on a comparison between the precise locations determined from the Wi-Fi based technique and the one or more image recognition techniques. If the validation fails, the tracking and identification engine 116 re-evaluates the precise location of the target user equipment using the Wi-Fi based technique and the one or more image recognition techniques.

The tracking and identification engine 116 is configured to send a priority alert to the store terminal device 102a if the precise location of the target user equipment is validated. The priority alert is representative of an association between the target user equipment and a valued user, and is flagged as requiring immediate attention at the precise location. In another embodiment of the present invention, the tracking and identification engine 116 is configured to send a priority alert to the store terminal device 102a after the precise location of the target user equipment is determined via any one of the Wi-Fi based technique or the image recognition technique.

In an embodiment of the present invention, the tracking and identification subsystem 110 may be implemented in a cloud computing architecture in which data, applications, services, and other resources are stored and delivered through shared data-centers. In an exemplary embodiment of the present invention, the functionalities of the tracking and identification subsystem 110 are delivered to the store terminal device 102a and the user equipment 108 as software as a service (SAAS) over respective communication networks.

In another embodiment of the present invention, the tracking and identification subsystem 110 may be implemented as a client-server architecture, wherein the store terminal device 102a accesses a server hosting the subsystem 110 over a communication network. In an exemplary embodiment of the present invention, the tracking and identification subsystem 110 may be accessed through a web address via the store terminal device 102a.

Figure 2:
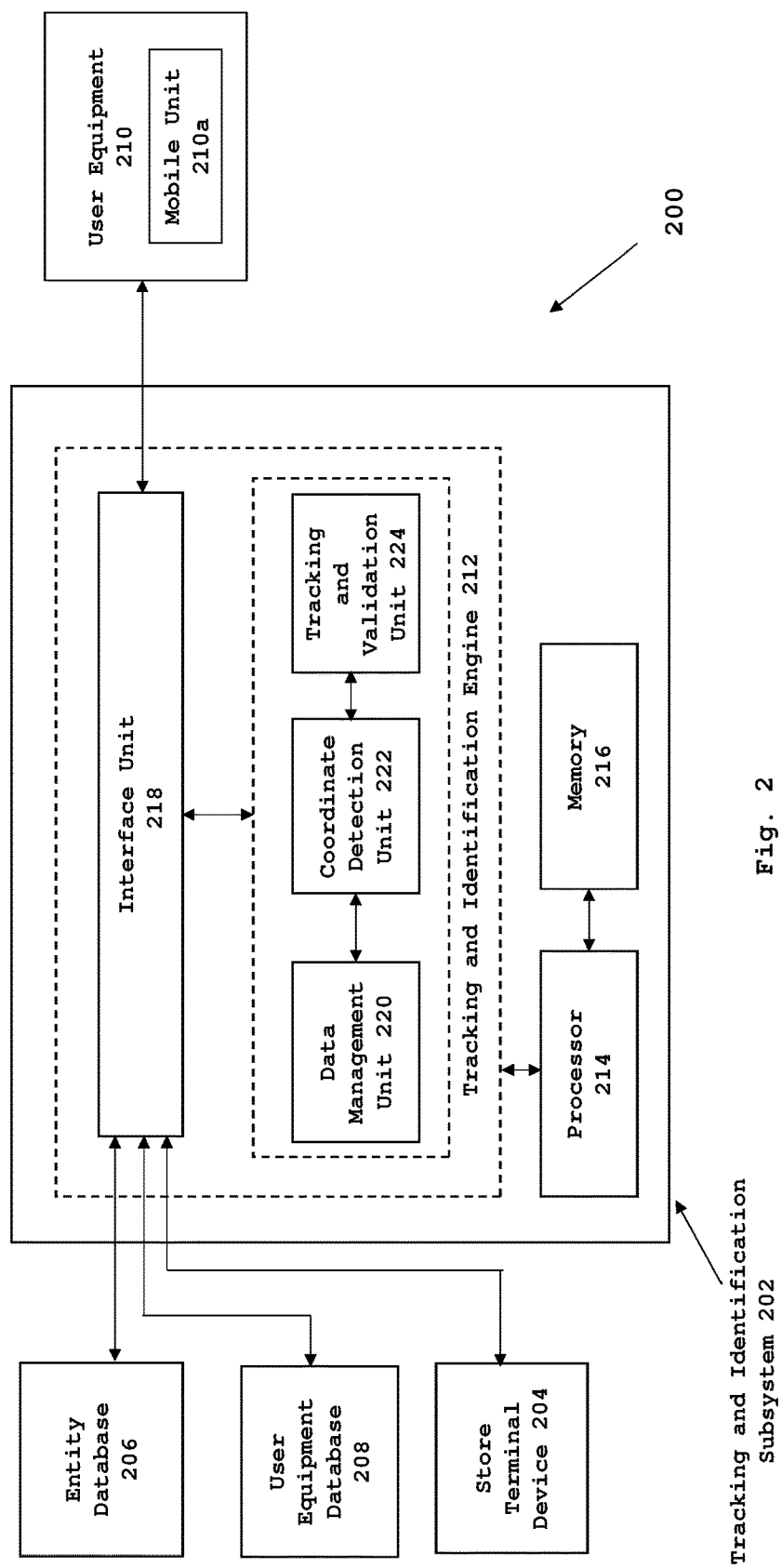
FIG. 2 is a detailed block diagram of a tracking and identification subsystem, in accordance with various embodiments of the present invention.

FIG. 2 is a detailed block diagram of a tracking and identification subsystem, in accordance with various embodiments of the present invention.

The tracking and identification subsystem 202 interfaces with the store terminal device 204, the entity database 206, and the user equipment database 208 to retrieve information associated with the business entity (not shown) and the user equipment 210. Further, the tracking and identification subsystem 202 interfaces with the user equipment 210 to receive one or more inputs and one or more requests. The tracking and identification subsystem 202 is configured to automatically retrieve, extract and analyse complex data, track the user equipment 210, identify a target user equipment, determine precise location of the target user equipment, maintain the entity database 206 and the user equipment database 208 and send notifications to the store 102 (FIG. 1) via the store terminal device 204. Further, the tracking and identification subsystem 202 is configured to complete one or more requests received from the user equipment 210. The tracking and identification subsystem 202 comprises a tracking and identification engine 212, a processor 214 and a memory 216.

In various embodiments of the present invention, the tracking and identification engine 212 has multiple units which work in conjunction with each other for tracking and identifying a user equipment associated with a user. The various units of the tracking and identification engine 212 are operated via the processor 214 specifically programmed to execute instructions stored in the memory 216 for executing respective functionalities of the units of the tracking and identification engine 212 in accordance with various embodiments of the present invention.

In an embodiment of the present invention, the tracking and identification engine 212 comprises an interface unit 218, a data management unit 220, a coordinate detection unit 222, and a tracking and validation unit 224.

The interface unit 218 is configured to retrieve data from the store terminal device 204, the entity database 206, the user equipment database 208 and the user equipment 210. Further, the interface unit 218 is configured to transmit the retrieved data to one or more units (220,222,224). In an embodiment of the present invention, the tracking and identification engine 212 is configured to receive the one or more inputs and the one or more requests from the user equipment 210 via a mobile unit 210*a*.

In an embodiment of the present invention, the data management unit 220 is configured to receive the data retrieved by the interface unit 218. In particular, the data management unit 220 is configured to receive the one or more inputs and the one or more requests from the interface unit 218. The one or more inputs and the one or more requests may include, but are not limited to user store location, store direction, purchase history, available offers and discounts. The data management unit 220 analyses the received one or more inputs and one or more requests. Further, the data management classifies the one or more inputs and requests into two categories based on the need of processing. In an exemplary embodiment of the present invention, the one or more inputs and requests pertaining to purchase history, available offers and discounts are completed by the data management unit 220 by retrieving data from the entity database 206 and the user equipment database 208 via the interface unit 218. The one or more inputs and the one or more requests such as user store location and store direction which require further processing are transmitted to the coordinate detection unit 222.

In an embodiment of the present invention, the coordinate detection unit 222 is configured to receive the one or more inputs and the one or more requests such as user store location and store direction from the data management unit 220. The coordinate detection unit 222 is configured to perform a check to determine if the received user store location is associated with the business entity (not shown), where the user store location is representative of the store location the user is visiting. In an exemplary embodiment of the present invention, the user store location is the location of the store 102 as shown in FIG. 1. In particular, the coordinate detection unit 222 performs a check to determine if the user store location is included within the list of stores maintained in the entity database 206. The data management unit 220 sends a notification suggesting another store location to the user equipment 210 via the interface unit 218 if the user store location is not included within the list of stores. The coordinate detection unit 222 retrieves the user store coordinates from the entity database 206 if the user store location is included in the list of stores, and provides the store direction to the user equipment 210 via the interface unit 218. Further, the coordinate detection unit 222 triggers tracking and identification of the user equipment 210 via the tracking and validation unit 224.

In an embodiment of the present invention, the tracking and validation unit 224 is configured to receive the user store coordinates from the coordinate detection unit 222. Further, the tracking and validation unit 224 retrieves the user equipment ID and the phone number registered with the user equipment 210 via the interface unit 218. Further, the tracking and validation unit 224, retrieves the location coordinates of the user equipment based on at least one of: the user equipment ID or the registered phone number using one or more geospatial techniques. In an exemplary embodiment of the present invention, the tracking and validation unit 224, retrieves location coordinates of the registered phone number from an associated cellular network provider (not shown). The location coordinates of the registered phone number are representative of the location coordinates of the user equipment 210. The tracking and validation unit 224, performs a check to determine if a location coordinates of the user equipment 210 are same as the coordinates associated with user store location. The tracking and validation unit 224 continuously retrieves location coordinates of the user equipment 210 via the cellular network provider (not shown) until the location coordinates of the user equipment 210 are within a predefined range of the coordinates associated with the user store location. The tracking and validation unit 224 is configured to identify a target user equipment (as described in later part of the specification) if the location coordinates of the user equipment 210 are within a predefined range of coordinates of the user store location.

In another embodiment of the present invention, the tracking and validation unit 224 is configured to track the location coordinates of the user equipment 210 automatically without the one or more inputs and the one or more requests via a cellular network provider. Subsequently, the tracking and validation unit 224 suggests one or more nearby stores associated with the business entity (not shown). The tracking and validation unit 224 performs a check to determine if the location coordinates of the user equipment 210 are same as the location coordinates of the one or more suggested stores associated with the business entity (not shown). The tracking and validation unit 224 provides for identifying a target user equipment (as described in paragraph below) if the location coordinates of the user equipment 210 are within a predefined range of coordinates of the one or more stores associated with the business entity.

The tracking and validation unit 224 is configured to identify a target user equipment based on one or more parameters. The target user equipment is representative of the user equipment 210 associated with a valued user. In an exemplary embodiment of the present invention, the one or more parameters include, but are not limited to, discounts, offers availed and purchase history associated with the registered phone number or the user equipment ID, time duration of user visit in the one or more stores. In operation in an embodiment of the present invention, the tracking and validation unit 224 performs a check to determine if the registered phone number or the user equipment ID is stored within the user equipment database 208. If the registered phone number or user equipment ID is stored in the user equipment database 208, the tracking and validation unit 224 identifies the target user equipment based on the above described parameters. If the registered phone number or the user equipment ID is not stored in the user equipment database 208, the tracking and validation unit 224 identifies the user equipment 210 as a first time user equipment and updates the user equipment database 208 with associated phone number or user equipment ID. Further, the tracking and validation unit 224 is configured to collect other user equipment data such as store location of the one or more stores associated with the business entity (not shown) where the user equipment 210 visits, discounts, offers availed and purchases, time duration of a visit in the one or more stores, user name, address, face images and facial details associated with the user equipment 210 (not identified as the target user equipment). The user equipment data may be collected from the one or more Wi-Fi devices 102b (FIG. 1) and the one or more image capturing devices 102c (FIG. 1) via the store terminal device 204. The collected user equipment data is stored in the user equipment database 208 to identify the target user equipment in future.

Further, if the user equipment 210 is identified as the target user equipment, the tracking and validation unit 224 triggers a Wi-Fi based technique and one or more image recognition techniques to determine precise location of the target user equipment within the store 102 (FIG. 1). In another embodiment of the present invention, the tracking and validation unit 224 triggers either a Wi-Fi based technique or one or more image recognition techniques to determine precise location of the target user equipment within the store 102 (FIG. 1). The precise location of the target user equipment within the store 102 (FIG. 1) may include but is not limited to floor number and floor section associated with the store.

In an embodiment of the present invention, the tracking and validation unit 224 invokes the Wi-Fi based technique based on the location coordinates of the user equipment 210 to identify the precise location associated with the user equipment 210 identified as the target user equipment. In operation, the tracking and validation unit 224 invokes the store terminal device 204 to retrieve the user equipment ID associated with user equipment 210 (identified as the target user equipment). The store terminal device 204 retrieves the user equipment ID via the one or more Wi-Fi devices 102b (FIG. 1). As described in paragraph 21 with reference to FIG. 1, each of the one or more Wi-Fi devices 102b (FIG. 1) may be classified based on floor details of the store 102 (FIG. 1), such as floor number and floor section. The tracking and validation unit 224, determines at least the floor number associated with the user equipment 210 identified as the target user equipment from the Wi-Fi device database (not shown) maintained in the store terminal device 204. The floor details associated with the Wi-Fi device 102b (FIG. 1) receiving the user equipment ID is representative of the precise location of the user equipment 210 identified as the target user equipment.

Further, the tracking and validation unit 224, triggers an image recognition technique based on the location coordinates of the user equipment 210 to identify the precise location associated with the user equipment 210 identified as the target user equipment. In operation in an embodiment of the present invention, the tracking and validation unit 224 triggers the store terminal device 204 to retrieve the face images of the user associated with the user equipment 210 (identified as the target user equipment). The store terminal device 204 retrieves the face images of the users associated with user equipment 210 via the one or more image capturing devices 102c(FIG. 1). The tracking and validation unit 224 maps the retrieved face images with the face images stored in the user equipment database 208. If the retrieved images do not match, the tracking and validation unit 224 sends a warning notification to the store terminal device 204. The warning notification is representative that a different user is carrying the target user equipment and a manual face recognition is required. If the retrieved images match, the tracking and validation unit 224 marks the location of the image capturing device 102c (FIG. 1) which captured the face images as the precise location of the user equipment 210 identified as the target user equipment. The location of the image capturing device 102c (FIG. 1) may be retrieved from the image capturing device database (not shown) maintained in the store terminal device 204.

In operation in another embodiment of the present invention, the tracking and validation unit 224 retrieves face images of the user associated with the user equipment 210 (identified as the target user equipment) from the user equipment database 208. Further, the tracking and validation unit 224 invokes the store terminal device 204 to search for the user associated with the user equipment 210 (identified as the target user equipment) in the store which resembles the retrieved face images via the one or more image capturing devices 102c (FIG. 1). If the retrieved face images do not match with any of the users associated with the user equipment 210 in the store 102 (FIG. 1), the tracking and validation unit 224 sends a warning notification to the store terminal device 204 after a predefined number of attempts. The warning notification is representative that a different user is carrying the target user equipment and a manual face recognition is required. If the retrieved images match, the tracking and validation unit 224 marks the location of the image capturing device 102c (FIG. 1) which captured the face images as the precise location of the user equipment 210 identified as the target user equipment. The location of the image capturing device 102c (FIG. 1) may be retrieved from the image capturing device database (not shown) maintained in the store terminal device 204.

Furthermore, the tracking and validation unit 224 is configured to validate the precise location of the user equipment 210 identified as the target user equipment based on a comparison between the precise locations determined from the Wi-Fi based technique and the one or more image recognition techniques. If the validation fails, the tracking and validation unit 224 re-evaluates the precise location of the target user equipment using the Wi-Fi based technique and the one or more image recognition techniques.

The tracking and validation unit 224 is configured to send a priority alert to the store terminal device 204 if the precise location of the target user equipment is validated. The priority alert is representative of an association between the target user equipment and the valued user, and is flagged as requiring immediate attention at the second precise location. In another embodiment of the present invention, the tracking and validation unit 224 is configured to send a priority alert to the store terminal device 204 after the precise location of the target user equipment is determined via any one of the Wi-Fi based technique or the image recognition technique.

Figure 3:
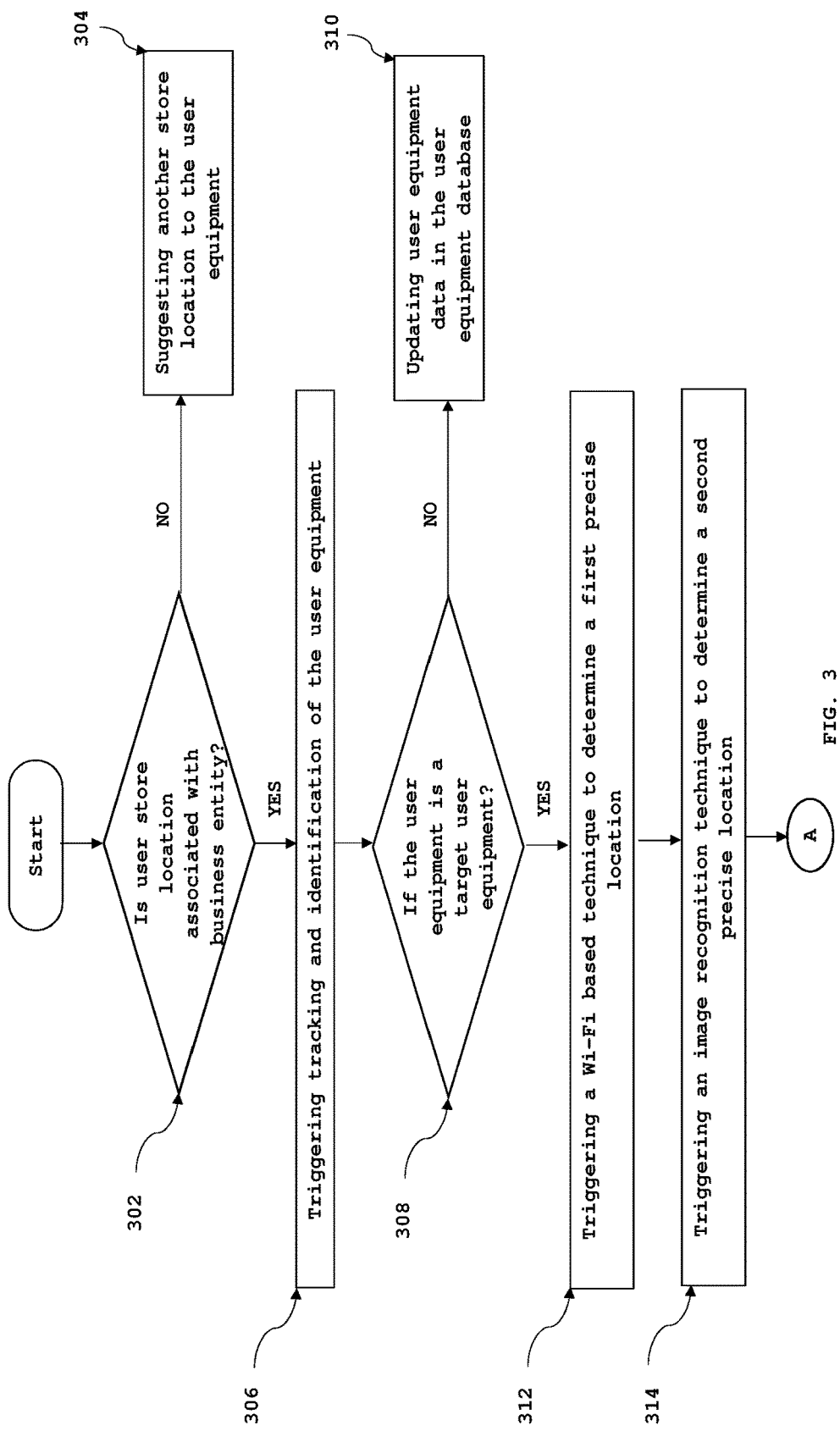
FIG. 3 is a flowchart illustrating a method for tracking and identifying user equipment, in accordance with various embodiments of the present invention.
Figure 3:
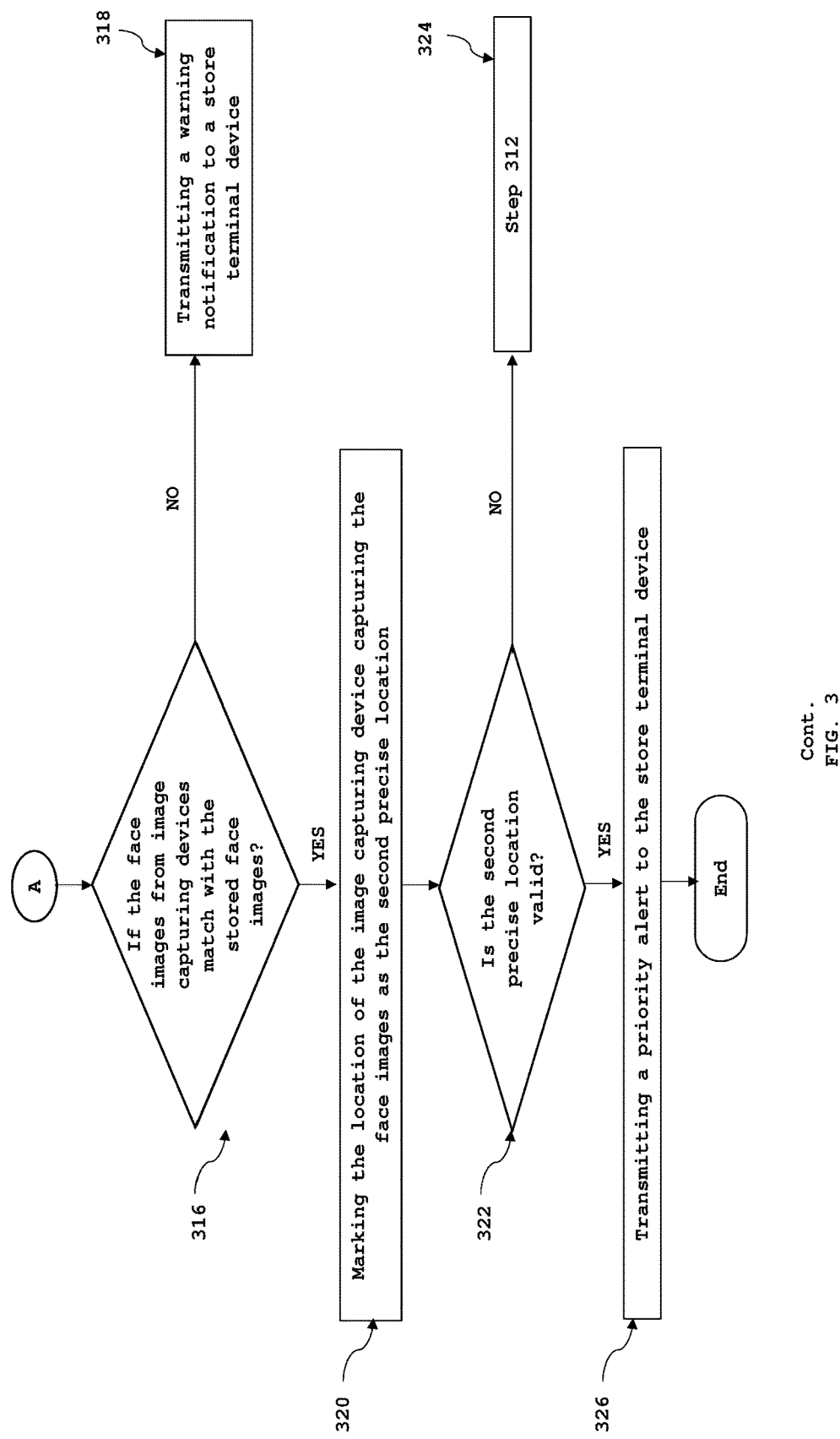

FIG. 3 is a flowchart illustrating a method for tracking and identifying user equipment, in accordance with various embodiments of the present invention.

At step 302, a check is performed to determine if the user store location is associated with a business entity. The user store location is representative of the store location the user is visiting. In particular, a check is performed to determine if the user store location received from a user equipment is included within the list of stores maintained in an entity database.

At step 304, a notification suggesting another store location is transmitted to the user equipment if the user store location is not included within the list of stores.

At step 306, tracking and identification of the user equipment is triggered if the user store location is included in the list of stores. In particular, the tracking and identification of the user equipment is triggered to determine location coordinates of the user equipment. In operation, the user store coordinates are retrieved from the entity database. Further, the user equipment ID and the phone number registered with the user equipment are retrieved. The location coordinates of the user equipment are retrieved based on the registered phone number or the user equipment ID using one or more geospatial techniques. In particular, the location coordinates of the registered phone number are retrieved from an associated cellular network provider (not shown). The location coordinates of the registered phone number are representative of the location coordinates of the user equipment. The location coordinates of the user equipment are continuously retrieved via the cellular network provider until the location coordinates of the user equipment are within a predefined range of the coordinates associated with the user store location.

At step 308, a check is performed to determine if the user equipment is a target user equipment. In an embodiment of the present invention, the check to identify the target user equipment is performed if the location coordinates of the user equipment are within a predefined range of coordinates of the user store location. The target user equipment is identified based on one or more parameters. The target user equipment is representative of the user equipment associated with a valued user. In an exemplary embodiment of the present invention, the one or more parameters include, but are not limited to, availability of the registered phone number or user equipment ID in the user equipment database, discounts, offers availed and purchase history associated with the registered phone number or the user equipment ID, time duration of user visit in the one or more stores.

At step 310, if the user equipment is not the target user equipment, user equipment data is updated in the user equipment database. The user equipment data may include, but is not limited to the registered phone number, user equipment ID, store location of the one or more stores associated with the business entity where the user equipment visits, discounts, offers availed and purchases, time duration of a visit in the one or more stores, user name, address, face images and facial details associated with the user equipment.

At step 312, if the user equipment is identified as the target user equipment, a Wi-Fi based technique is triggered. In an embodiment of the present invention, the Wi-Fi based technique is triggered based on the location coordinates of the user equipment to identify the precise location associated with the user equipment identified as the target user equipment. The precise location of the target user equipment may include, but is not limited to floor number and floor section associated with the user store location. In operation, the user equipment ID is retrieved via a one or more Wi-Fi devices. Each of the one or more Wi-Fi devices are classified based on floor details of the user store location, such as floor number and floor section. The floor details associated with the Wi-Fi device receiving the user equipment ID is representative of the first precise location of the user equipment identified as the target user equipment.

At step 314, an image recognition technique is triggered. In an embodiment of the present invention, the image recognition technique is triggered based on the location coordinates of the user equipment to identify the precise location associated with the user equipment identified as the target user equipment. In operation in an exemplary embodiment of the present invention, the face images of the user associated with the user equipment identified as the target user equipment are retrieved via one or more image capturing devices. The retrieved face images are mapped with the face images stored in the user equipment database. In operation in another embodiment of the present invention, face images of the user associated with user equipment identified as the target user equipment are retrieved from the user equipment database. Further, the user associated with the user equipment identified as the target user equipment which resembles the retrieved face images is searched in the store via the one or more image capturing devices.

At step 316, a check is performed to determine if the face images retrieved via one or more image capturing devices match with the face images stored in the user equipment database. At step 318, if the retrieved images do not match, a warning notification is transmitted to a store terminal device. The warning notification is representative that a different user is carrying the target user equipment and a manual face recognition is required.

At step 320, if the retrieved images match, the location of the image capturing device capturing the face images is marked as the second precise location of the user equipment identified as the target user equipment.

At step 322, a check is performed to determine if the second precise location of the target user equipment is valid. In an embodiment of the present invention, the second precise location of the user equipment identified as the target user equipment is validated by comparing the first and the second precise locations determined from the Wi-Fi based technique and the one or more image recognition techniques, respectively.

At step 324, if the validation fails, the first and the second precise locations of the target user equipment are re-evaluated using the Wi-Fi based technique and the one or more image recognition techniques.

At step 326, a priority alert is transmitted to the store terminal device if the second precise location of the target user equipment is validated. The priority alert is representative of association between the target user equipment and the valued user, and is flagged as requiring immediate attention at the second precise location.

Figure 4:
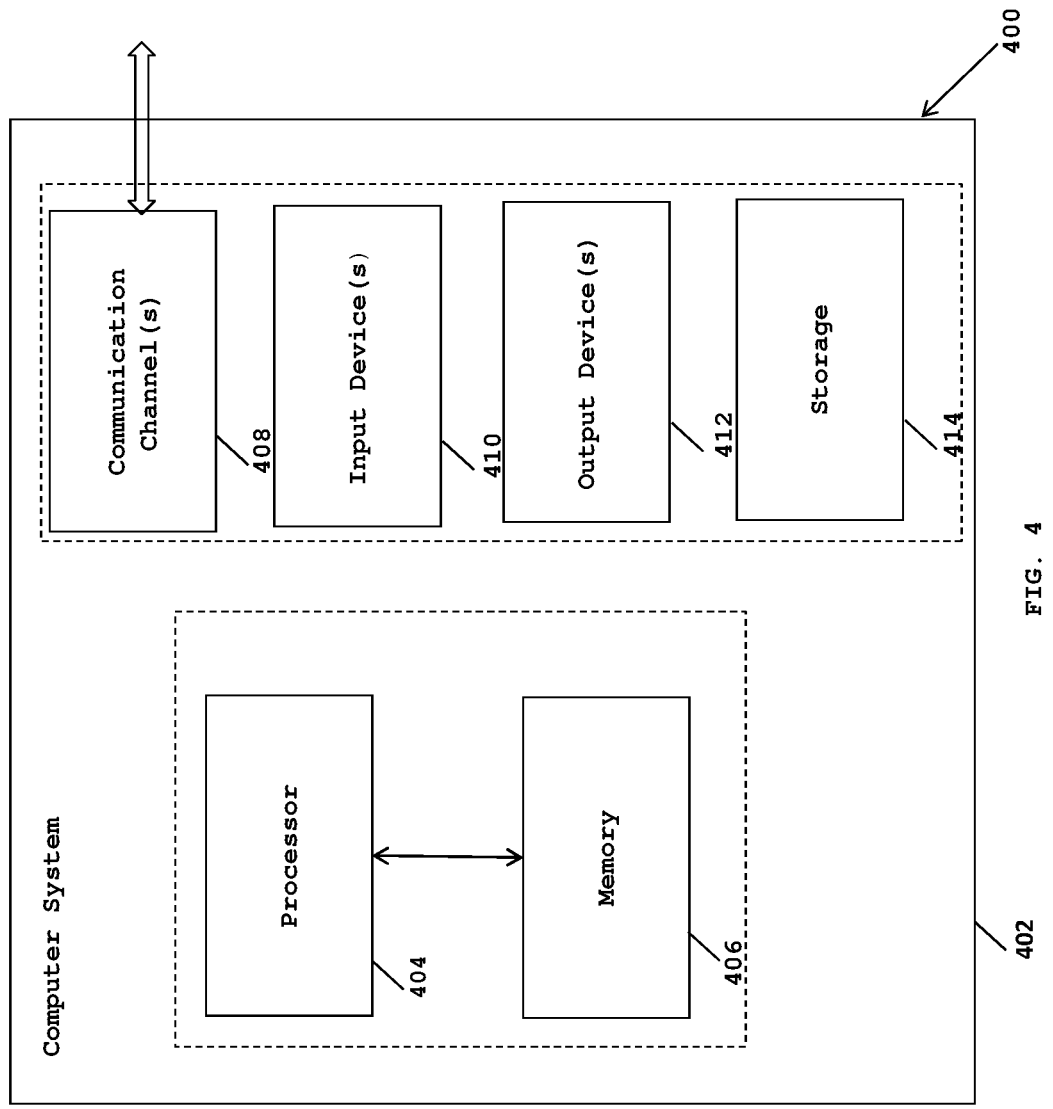
FIG. 4 illustrates an exemplary computer system in which various embodiments of the present invention may be implemented.

FIG. 4 illustrates an exemplary computer system in which various embodiments of the present invention may be implemented. The computer system 402 comprises a processor 404 and a memory 406. The processor 404 executes program instructions and is a real processor. The computer system 402 is not intended to suggest any limitation as to scope of use or functionality of described embodiments. For example, the computer system 402 may include, but not limited to, a programmed microprocessor, a micro-controller, a peripheral integrated circuit element, and other devices or arrangements of devices that are capable of implementing the steps that constitute the method of the present invention. In an embodiment of the present invention, the memory 406 may store software for implementing various embodiments of the present invention. The computer system 402 may have additional components. For example, the computer system 402 includes one or more communication channels 408, one or more input devices 410, one or more output devices 412, and storage 414. An interconnection mechanism (not shown) such as a bus, controller, or network, interconnects the components of the computer system 402. In various embodiments of the present invention, operating system software (not shown) provides an operating environment for various software executing in the computer system 402, and manages different functionalities of the components of the computer system 402.

The communication channel(s) 408 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 410 may include, but not limited to, a keyboard, mouse, pen, joystick, trackball, a voice device, a scanning device, touch screen or any another device that is capable of providing input to the computer system 402. In an embodiment of the present invention, the input device(s) 410 may be a sound card or similar device that accepts audio input in analog or digital form. The output device(s) 412 may include, but not limited to, a user interface on CRT or LCD, printer, speaker, CD/DVD writer, or any other device that provides output from the computer system 402.

The storage 414 may include, but not limited to, magnetic disks, magnetic tapes, CD-ROMs, CD-RWs, DVDs, flash drives or any other medium which can be used to store information and can be accessed by the computer system 402. In various embodiments of the present invention, the storage 414 contains program instructions for implementing the described embodiments.

The present invention may suitably be embodied as a computer program product for use with the computer system 402. The method described herein is typically implemented as a computer program product, comprising a set of program instructions which is executed by the computer system 402 or any other similar device. The set of program instructions may be a series of computer readable codes stored on a tangible medium, such as a computer readable storage medium (storage 414), for example, diskette, CD-ROM, ROM, flash drives or hard disk, or transmittable to the computer system 402, via a modem or other interface device, over either a tangible medium, including but not limited to optical or analogue communications channel(s) 408. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention.

We claim:

1. A method for tracking and identifying a user equipment, wherein the method is implemented by at least one processor executing program instructions stored in a memory, the method comprising:
    identifying, by the processor, a user equipment within a predefined range of predetermined location coordinates of one or more stores associated with a business entity;
    determining, by the processor, the user equipment as a target user equipment using one or more parameters, wherein the target user equipment is representative of a user equipment associated with a valued user; and
    determining, by the processor, a precise location of the target user equipment within one or more stores associated with the business entity via at least one of a Wi-Fi based technique and an image recognition technique, and wherein determining the precise location of the target user equipment includes:
    (a) determining a first precise location of the target user equipment via the Wi-Fi based technique;
    (b) determining a second precise location of the target user equipment via the image recognition technique;
    (c) mapping the second precise location with the first precise location to determine the precise location of the target user equipment;
    (d) repeating steps (a) and (b) until a valid mapping is ascertained; and
    (e) transmitting a priority alert to a store terminal device based on the valid mapping, wherein the priority alert is representative of an association between the target user equipment and the valued user, and the priority alert is flagged as requiring immediate attention at the second precise location.

2. The method as claimed in claim 1, wherein the precise location, the first precise location and the second precise location includes floor number and floor section within respective one or more stores associated with the business entity.

3. The method as claimed in claim 1, wherein determining the precise location via the Wi-Fi based technique comprises determining floor number and floor section associated with a Wi-Fi device receiving a user equipment ID associated with the user equipment identified as the target user equipment, wherein the floor details associated with the Wi-Fi device receiving the user equipment ID is representative of the first precise location of the target user equipment.

4. The method as claimed in claim 1, wherein determining the precise location via the image recognition technique includes:
    mapping one or more face images of the user associated with the target user equipment retrieved via one or more image capturing devices with one or more stored face images of the user associated with the user equipment identified as the target user equipment;
    determining if the one or more face images retrieved via one or more image capturing devices match with the one or more stored face images; and
    marking the location of the image capturing device which captures the face images of the target user equipment as the second precise location, wherein the location of the image capturing device includes floor number and floor section.

5. The method as claimed in claim 1, wherein determining the precise location via the image recognition technique includes:

searching the user associated with the user equipment identified as the target user equipment which resembles one or more stored face images via one or more image capturing devices; and marking the location of the image capturing device which captures the face images of the user associated with the target user equipment as the second precise location, wherein the location of the image capturing device includes floor number and floor section.

6. The method as claimed in claim 4, wherein a warning notification is transmitted to the store terminal device if the one or more face images retrieved via the one or more image capturing devices do not match with the one or more stored face images.

7. The method as claimed in claim 1, wherein identifying the user equipment within a predefined range of predetermined location coordinates of one or more stores associated with a business entity includes:

(a) determining an association between a user store location with the business entity based on the user store location received via the user equipment, wherein the user store location is representative of the store location the user is visiting, further wherein determining the association includes searching the user store location in a list of stores maintained in an entity database;

(b) retrieving a location coordinates of the user equipment based on at least one of a phone number and user equipment Id registered with the user equipment;

(c) mapping the location coordinates of the user equipment with the predetermined location coordinates of the user store location; and (d) repeating steps b and c until a valid mapping is ascertained.

8. The method as claimed in claim 7, wherein a notification suggesting another store location is transmitted to the user equipment if the user store location is not included within the list of stores.

9. The method as claimed in claim 1, wherein the one or more parameters include discounts, offers availed and purchase history associated with the registered phone number or the user equipment ID, time duration of user visit in the one or more stores.

10. The method as claimed in claim 1, wherein the method comprises updating a user equipment database with user equipment data if the user equipment is not identified as the target user equipment, wherein further the user equipment data includes a registered phone number, user equipment ID, store location of one or more stores associated with the business entity where the user equipment visits, discounts, offers availed and purchases, time duration of a visit in the one or more stores, user name, address, face images and facial details associated with the user equipment.

11. A system for tracking and identifying a user equipment, wherein the system interfaces with an entity database, a user equipment database and a store terminal device, the system comprising:

a memory storing program instructions; a processor configured to execute program instructions stored in the memory; and a tracking and identification engine in communication with the processor and configured to:

identify the user equipment within a predefined range of predetermined location coordinates of one or more stores associated with a business entity;

determine the user equipment as a target user equipment using one or more parameters, wherein the target user equipment is representative of a user equipment associated with a valued user; and determine a precise location of the target user equipment within one or more stores associated with the business entity via at least one of: a Wi-Fi based technique and an image recognition technique, and wherein the determination of the precise location of the target user equipment within one or more stores associated with the business entity includes:

(a) determining a first precise location of the target user equipment via the Wi-Fi based technique;

(b) determining a second precise location of the target user equipment via the image recognition technique;

(c) mapping the second precise location with the first precise location to determine the precise location of the target user equipment;

(d) repeating steps (a) and (b) until a valid mapping is ascertained; and (e) transmitting a priority alert to a store terminal device based on the valid mapping, wherein the priority alert is representative of an association between the target user equipment and the valued user, and the priority alert is flagged as requiring immediate attention at the second precise location.

12. The system as claimed in claim 11, wherein the precise location, the first precise location and the second precise location includes floor number and floor section within respective one or more stores associated with the business entity.

13. The system as claimed in claim 11, wherein tracking and identification engine comprises a tracking and validation unit in communication with the processor, said tracking and validation unit is configured to determine the precise location of the target user equipment via at least one of: the Wi-Fi based technique and the image recognition technique.

14. The system as claimed in claim 13, wherein the tracking and validation unit is configured to determine the precise location via the image recognition technique by:

searching the user associated with the target user equipment which resembles one or more stored face images via one or more image capturing devices; and marking the location of the image capturing device which captures the face images of the user associated with the target user equipment as the second precise location, wherein the location.

15. The system as claimed in claim 14, wherein the tracking and validation unit is configured to transmit a warning notification to the store terminal device if the one or more face images retrieved via the one or more image capturing devices do not match with the one or more stored face images.

16. The system as claimed in claim 13, wherein the tracking and validation unit is configured to store and update the user equipment database with a user equipment data, further wherein the user equipment data includes a registered phone number, user equipment ID, store location of one or more stores associated with the business entity where the user equipment visits, discounts, offers availed and purchases, time duration of a visit in the one or more stores, user name, address, face images and facial details associated with the user equipment.

17. The system as claimed in claim 11, wherein determining the precise location of the target user equipment by the tracking and validation unit via the Wi-Fi based technique comprises determining floor number and floor section associated with a Wi-Fi device receiving a user equipment ID associated with the target user equipment, wherein the floor details associated with the Wi-Fi device receiving the user equipment ID is representative of the first precise location of the target user equipment.

18. The system as claimed in claim 11, wherein determining the precise location by the tracking and validation unit via the image recognition technique includes:
   mapping one or more face images of the user associated with the target user equipment retrieved via one or more image capturing devices with one or more stored face images of the user associated with the user equipment identified as the target user equipment;
   determining if the one or more face images retrieved via one or more image capturing devices match with the one or more stored face images; and
   marking the location of the image capturing device which captures the face images of the target user equipment as the second precise location, wherein the location of the image capturing device includes floor number and floor section.

19. The system as claimed in claim 11, wherein tracking and identification engine comprises a coordinate detection unit in communication with the processor, said coordinate detection unit is configured to identify the user equipment within the predefined range of predetermined location coordinates of one or more stores associated with a business entity by:
   (a) determining an association between a user store location with the business entity based on the user store location received via the user equipment, wherein the user store location is representative of the store location the user is visiting, further wherein determining the association includes searching the user store location in a list of stores maintained in an entity database;
   (b) retrieving location coordinates of the user equipment based on at least one of a phone number and user equipment Id registered with the user equipment;
   (c) mapping the location coordinates of the user equipment with the predetermined location coordinates of the user store location; and
   (d) repeating steps b and c until a valid mapping is ascertained.

20. The system as claimed in claim 19, wherein tracking and identification engine comprises a data management unit in communication with the processor, said data management unit is configured to transmit a notification suggesting another store location to the user equipment if the user store location is not included within the list of stores.

21. The system as claimed in claim 11, wherein the one or more parameters include discounts, offers availed and purchase history associated with the registered phone number or the user equipment ID, time duration of user visit in the one or more stores.

22. A computer program product, comprising:
   a non-transitory computer-readable medium having computer-readable program code stored thereon, the computer-readable program code comprising instructions that, when executed by a processor, cause the processor to:
   identify the user equipment within a predefined range of predetermined location coordinates of one or more stores associated with a business entity;
   determine the user equipment as a target user equipment using one or more parameters based, wherein the target user equipment is representative of a user equipment associated with a valued user; and
   determine a precise location of the target user equipment within one or more stores associated with the business entity via at least one of: a Wi-Fi based technique and an image recognition technique, and wherein the determination of the precise location of the target user equipment includes:
   (a) determining a first precise location of the target user equipment via the Wi-Fi based technique;
   (b) determining a second precise location of the target user equipment via the image recognition technique;
   (c) mapping the second precise location with the first precise location to determine the precise location of the target user equipment;
   (d) repeating steps (a) and (b) until a valid mapping is ascertained; and
   (e) transmitting a priority alert to a store terminal device based on the valid mapping, wherein the priority alert is representative of an association between the target user equipment and the valued user, and the priority alert is flagged as requiring immediate attention at the second precise location.

* * * * *